US010292362B2

(12) United States Patent
Leach

(10) Patent No.: US 10,292,362 B2
(45) Date of Patent: May 21, 2019

(54) ANIMAL FEEDER

(71) Applicant: Craig Leach, Gilston (AU)

(72) Inventor: Craig Leach, Gilston (AU)

(*) Notice: Subject to any disclaimer, the term of this patent is extended or adjusted under 35 U.S.C. 154(b) by 0 days.

(21) Appl. No.: 15/556,819

(22) PCT Filed: Mar. 9, 2016

(86) PCT No.: PCT/AU2016/050166
§ 371 (c)(1),
(2) Date: Sep. 8, 2017

(87) PCT Pub. No.: WO2016/141433
PCT Pub. Date: Sep. 15, 2016

(65) Prior Publication Data
US 2018/0042201 A1    Feb. 15, 2018

(30) Foreign Application Priority Data

Mar. 9, 2016 (AU) .................................. 2015201215

(51) Int. Cl.
*A01K 5/01* (2006.01)
*A01K 5/02* (2006.01)
*A01K 39/01* (2006.01)

(52) U.S. Cl.
CPC .............. *A01K 5/01* (2013.01); *A01K 5/0114* (2013.01); *A01K 5/0225* (2013.01); *A01K 39/01* (2013.01)

(58) Field of Classification Search
CPC ...... A01K 5/01; A01K 5/0114; A01K 5/0225; A01K 5/025
USPC ................. 119/52.1, 58, 61.1, 61.3
See application file for complete search history.

(56) References Cited

U.S. PATENT DOCUMENTS

| 896,268 A * | 8/1908 | Bennett ................ A01K 5/0225 |
| | | 119/52.1 |
| 1,205,557 A * | 11/1916 | Metzger .................. A01K 5/01 |
| | | 119/416 |
| 1,587,548 A | 6/1926 | Olson |
| 2,475,207 A | 7/1949 | Smith |
| 3,033,164 A | 5/1962 | Evers |
| 3,999,520 A | 12/1976 | Feterl |
| 4,242,985 A | 1/1981 | Freeborn |

(Continued)

OTHER PUBLICATIONS

Patent Examination Report in AU Application No. 2015201215 dated Jul. 17, 2015, pp. 1-7.

(Continued)

*Primary Examiner* — David J Parsley
(74) *Attorney, Agent, or Firm* — Cooper Legal Group, LLC

(57) ABSTRACT

An animal feeding device comprising a body having a first opening in a first end thereof and a second opening in a second end thereof, the body being in the form of a channel having a substantially C-, U- or V-shape in cross section and comprising a passageway extending between the first opening and the second opening, the body further comprising one or more bends therein such that the first opening and the second opening are provided in different orientations to one another, and wherein the body is adapted to substantially preclude the accumulation of animal feed on an inner surface of the passageway during use, and wherein in use an open portion of the channel is located so as to abut an inner surface of a receptacle in which animal feed is housed.

15 Claims, 8 Drawing Sheets

(56) References Cited

U.S. PATENT DOCUMENTS

| | | | | |
|---|---|---|---|---|
| 4,432,304 | A * | 2/1984 | Johnsson | A01K 1/0356 119/477 |
| 4,538,548 | A * | 9/1985 | Page | A01K 5/0241 119/52.1 |
| 4,976,222 | A * | 12/1990 | Cooke | A01K 5/01 119/60 |
| 5,394,832 | A * | 3/1995 | Briley | A01K 5/01 119/51.11 |
| 5,404,838 | A * | 4/1995 | Khan | A01K 5/0114 119/51.5 |
| 5,992,349 | A * | 11/1999 | Sachs | A01K 5/0225 119/52.1 |
| 6,481,374 | B1 * | 11/2002 | Lillig | A01K 5/0225 119/52.1 |
| 7,302,912 | B2 * | 12/2007 | Boyer | A01K 5/0225 119/51.01 |
| 8,011,322 | B1 * | 9/2011 | Jackson | A01K 39/012 119/52.2 |
| 8,910,592 | B1 | 12/2014 | Kurtz | |
| 2004/0139919 | A1 | 7/2004 | Dodds | |

OTHER PUBLICATIONS

International Search Report and Written Opinion in PCT Application No. PCT/AU2016/050166 dated May 23, 2016, pp. 1-10.
Cheap chicken feeder, how to build a bulk chicken/pultry feeder, PT1, Rob Bob's Backyard Farming [Viewd on Internet on May 19, 2016] https://www.youtube.com/watch?v=pJvqH7a8SA, Published on Jan. 9, 2013.

* cited by examiner

ANIMAL FEEDER

TECHNICAL FIELD

The present invention relates to an animal feeding device. In particular, the present invention relates to an animal feeding device that reduces the wastage of feed.

BACKGROUND ART

Animal feeders are used with many types of domesticated animals, such as poultry (chickens, turkeys, geese, ducks, quail, pheasants, guineafowl and the like), livestock (such as cattle, sheep, pigs, goats, horses, deer, alpacas and the like) and pets (such as dogs, cats, rabbits, guinea pigs and the like). Typically, a quantity of feed is placed in the animal feeding device so that the animal can access the feed when hungry.

Many animal feeding devices are "open", in that the feed in the feeder is accessible through large openings. However, these feeders suffer from the drawback that feed is often wasted by animals not finishing the entire meal or spilling feed onto the ground. Not only is this waste of feed costly, but it also attracts birds, vermin and other pests to the area. As a result, animal owners must take care to clean up spilled feed to discourage pests.

Thus, there would be an advantage if it were possible to provide an animal feeding device that reduced the wastage of animal feed.

It will be clearly understood that, if a prior art publication is referred to herein, this reference does not constitute an admission that the publication forms part of the common general knowledge in the art in Australia or in any other country.

SUMMARY OF INVENTION

The present invention is directed to an animal feeding device, which may at least partially overcome at least one of the abovementioned disadvantages or provide the consumer with a useful or commercial choice.

With the foregoing in view, the present invention in one form, resides broadly in an animal feeding device comprising a body having a first opening in a first end thereof and a second opening in a second end thereof, the body being in the form of a channel having a substantially C-, U- or V-shape in cross section and comprising a passageway extending between the first opening and the second opening, the body further comprising one or more bends therein such that the first opening and the second opening are provided in different orientations to one another, and wherein the body is adapted to substantially preclude the accumulation of animal feed on an inner surface of the passageway during use, and wherein in use an open portion of the channel is located so as to abut an inner surface of a receptacle in which animal feed is housed.

The body of the animal feeding device may be of any suitable size, shape or configuration, and it will be understood that the size of the body will be dependent on the animal with which the animal feeding device is intended to be used. For instance, when the animal feeding device is to be used for poultry, the animal feeding device will be relatively small, whereas the animal feeding device will be relatively large when used with livestock such as cattle and horses.

The body may be fabricated from any suitable material, such as, but not limited to, metal, plastic, wood, fibreglass or the like, or any suitable combination thereof. Preferably, however, the body is fabricated at least partially from plastic, such as PVC, PET, HDPE, LDPE, polycarbonate, polystyrene and polypropylene or the like, or any suitable combination thereof.

In other embodiments of the invention, the animal feeding device may be at least partially fabricated from a transparent or semi-transparent material (such as glass, Perspex, plastic or the like) so that a user can view the interior of the animal feeding device, for instance to check the level of animal feed within the feeder.

Preferably, the passageway may be defined by an inner surface of the body. In some embodiments of the invention, the passageway may have a tortuous path through the body. In this embodiment, it is envisaged that the passageway may not be co-axial with the body along at least a portion of its length.

More preferably, however, the body may be substantially hollow, such that the passageway extends substantially co-axially with the body along its length. Thus, in this embodiment of the invention, the body may be substantially tubular. The body may have any suitable cross-sectional shape, and may be, for instance, circular, square, triangular, oval or the like. A skilled addressee will understand that the cross-sectional shape of the body is not critical.

Preferably, the passageway may have the same cross-sectional shape as the body, although it will be understood that the cross-sectional shape of the passageway may differ from the cross-sectional shape of the body. Furthermore, the cross-sectional shape of the passageway may vary along the length of the passageway.

In use, it is envisaged that the first opening may be located in an upper region of the body, while the second opening may be located in a lower region of the body. In a particular embodiment, the first and second openings may comprise the open ends of the tubular body.

In some embodiments, the first and second openings may extend across the entire width (or diameter) of the respective open ends of the tubular body. Alternatively, the size of at least one of the first and second openings may be less than the entire width (or diameter) of the respective open ends of the tubular body.

In other embodiments of the invention, the body may be substantially C-, U- or V-shaped in cross-section. Thus, the body may be in the form of a channel. It is envisaged that, in this embodiment of the invention, the open portion of the channel may be located so as to abut an inner surface of a receptacle in which animal feed is housed. The body may simply abut the inner surface of the receptacle in use, or may be held in place using adhesives, sealants, fasteners or the like, or any suitable combination thereof. In this embodiment of the invention, it is envisaged that at least a portion of the wall of the receptacle against which the body abuts may be fabricated from an at least partially transparent or semi-opaque material. In this way, a user may view the level of feed within the body from the outside of the receptacle. Specifically, the user can look through the at least partially transparent or semi-opaque material of the wall of the receptacle and observe the level of feed within the body.

In some embodiments of the invention, the entire wall against which the body abuts may be fabricated from the at least partially transparent or semi-opaque material. More preferably, however, only a portion of the wall against which the open portion of the channel abuts may be fabricated from the at least partially transparent or semi-opaque material. In this embodiment, only a part of the portion of the wall against which the open portion of the channel abuts may be fabricated from the at least partially transparent or semi-opaque material. However, in a most preferred embodiment of the invention the entire portion of the wall against which the open portion of the channel abuts may be fabricated from the at least partially transparent or semi-opaque material.

Preferably, the at least a portion of the wall of the receptacle against which the body abuts may be fabricated from a substantially transparent material. Any suitable material may be used, such as, but not limited to, glass, plastic, fibreglass or the like, or any suitable combination thereof.

It is envisaged that, in use, the animal will put its head at least partially through the first opening and into the passageway. It is also envisaged that the second opening will be in communication with a source of animal feed such that animal fees at least partially enters the animal feeding device through the second opening. In this embodiment of the invention, it is envisaged that the size of at least the first opening may be restricted, such that the first opening may be smaller than the width (or diameter) of the respective open end of the body.

In embodiments of the invention in which the size of the first opening is restricted, it is envisaged that the size of the first opening will be restricted such that only the head (and possibly at least a portion of the neck) of one animal may enter the passageway at any time.

Preventing multiple animals from accessing the passageway (and therefore the animal feed) at the same time has a number of benefits. Firstly, when multiple animals access feed at the same time, competition and jostling between animals may lead to feed being spilled. Therefore, allowing only one animal to access the animal feed at a time means that the competition between animals (and the associated waste of feed) is eliminated. Secondly, the restricted opening means that an animal is unable to withdraw its head from the animal feeding device while holding large amounts of animal feed in its mouth. Again, this reduces the spillage (and associated waste) of animal feed.

The first opening may be restricted using any suitable technique. For instance, the animal feeding device may be fabricated with a restricted opening at the first end thereof. Alternatively, a cap or cover (hereinafter referred to collectively as a "cap") may be fitted at least partially over the first end of the body, the cap including an aperture therein that forms the first opening. The aperture may be of fixed dimensions, or may be adjustable so that the cap can be used with animals of different sizes. In embodiments of the invention in which the aperture is adjustable, the edges of the first opening may be slidably or hingedly adjustable so that the size of the first opening may be changed as desired.

The cap may be fitted to the first end of the body using any suitable technique. For instance, the cap may be attached to the body using a frictional engagement. Alternatively, the first end of the body and the cap may be provided with screw complementary screw-threaded portions. In other embodiments, the cap may be fitted to the body using one or more mechanical fasteners (bolts, nails, screws, rivets or the like, or a combination thereof), adhesives or the like.

In use, it is envisaged that the animal feeding device may be associated with a receptacle containing animal feed, such as a feed bin or the like. In this embodiment of the invention, it is envisaged that the animal feeding device may be located at least partially within the receptacle. Thus, it is envisaged that the animal feeding device forms or defines a cavity within the receptacle. Preferably, the animal feeding device is positioned such that animal feed enters the passageway through the second opening. An animal then puts its head into the passageway through the first opening to access the feed in the passageway. In this embodiment, it is envisaged that the first opening is positioned so that it is located adjacent a wall of the receptacle, and preferably an external wall. In this way the animal may gain access to the interior of the receptacle through the first opening. It is envisaged that external wall of the receptacle may contain an aperture through which the animal feeding device at least partially passes.

The first opening may be located substantially flush with the external surface of the receptacle, or a portion of the body containing the first opening may extend outwardly from the external surface of the receptacle. In other embodiments, the first opening may be located at the interior of the receptacle, so that an animal must first pass its head through the aperture in the receptacle before it can enter the first opening to access the animal feed.

In some embodiments of the invention, the first end of the body may be provided with one or more flange portions. In this embodiment of the invention, it is envisaged that the flange portions may be provided so as to retain the animal feeding device in place in relation to the receptacle in use. Preferably, the flange portions are larger than the aperture in the receptacle in which the animal feeding device is located. In this way, the flange portion may abut the surface of the receptacle. Specifically, it is envisaged that the flange portion may contact an outer surface of the receptacle such that the animal feeding device is unable to fully enter the receptacle through the aperture in the receptacle. The flange may simply be held in abutment with the outer surface of the receptacle, or may be secured thereto using any suitable technique. For instance, the flange may be secured to the outer surface of the receptacle using adhesives, one or more fasteners (screws, bolts, nails etc.), or any other suitable technique.

Although the aperture in the receptacle has been described as being in a wall, it will be understood that it could be in any suitable wall, such as a side wall, upper wall or the like.

The animal feeding device has one or more bends therein. Any suitable number of bends may be provided depending on the location and use of the animal feeding device. Most preferably, however, a single bend is provided in the animal feeding device, and it is envisaged that multiple bends may make it difficult for the animal to reach the feed.

In embodiments of the invention in which a single bend is provided in the animal feeding device, the bend may be of any suitable angle. Preferably, the bend is located between the first opening and the second opening. More specifically, the bend may be located between an upper portion of the animal feeding device, the upper portion containing the first opening, and a lower portion of the animal feeding device, the lower portion containing the second opening. The upper and lower portions may be provided at any suitable angle to one another. For instance, the upper and lower portions may be oriented at an angle of greater than 0° and less than 180° to one another. More preferably, the upper and lower portions may be oriented at an angle of greater than 25° and less than 155° to one another. Still more preferably, the upper and lower portions may be oriented at an angle of greater than 60° and less than 120° to one another. Yet more preferably, the upper and lower portions may be oriented at an angle of greater than 80° and less than 100° to one another. Most preferably, the upper and lower portions may be oriented at an angle of about 90° to one another. In a specific embodiment of the invention, the lower portion may be located in a substantially vertical position in use, while the upper portion may be located in a substantially horizontal position in use. Thus, in this specific embodiment of the invention, the body may be in the form of an elbow.

The upper and lower portions may be of any suitable length, and it will be understood that the lengths of the upper and lower portions will vary depending on the type of animals that will use the animal feeding device, the type of feed being used in the animal feeding device and the dimensions of the receptacle in which the animal feeding device is to be used. However, in some embodiments of the invention, the upper portion and the lower portion may be of substantially the same length. Alternatively, the upper and lower portions may be of different length to one another. In some embodiments of the invention, the lower portion may be longer than the upper portion.

As previously stated, the first and second openings are provided in different orientations to one another. The first and second openings may be located at any suitable orientation to one another. In some embodiments of the invention, the first and second openings may be provided at different angles to one another than the angle of the upper and lower portions to one another. More preferably, however, the first and second openings may be provided at substantially the same angle to one another as the angle of the upper and lower portions to one another. For instance, the first and second openings may be oriented at an angle of greater than 0° and less than 180° to one another. More preferably, the first and second openings may be oriented at an angle of greater than 25° and less than 155° to one another. Still more preferably, the first and second openings may be oriented at an angle of greater than 60° and less than 120° to one another. Yet more preferably, the first and second openings may be oriented at an angle of greater than 80° and less than 100° to one another. Most preferably, the first and second openings may be oriented at an angle of about 90° to one another. In a specific embodiment of the invention, the first opening may be located in a substantially vertical position in use, while the second opening may be located in a substantially horizontal position in use. Thus, in this specific embodiment of the invention, the body may be in the form of an elbow.

As previously stated, the body is adapted to substantially preclude the accumulation of animal feed on an inner surface of the passageway during use. This may be achieved using any suitable technique. Preferably, however, the body is shaped so as to substantially preclude the accumulation of animal feed on the inner surface of the passageway.

It will be understood that animal feed may accumulate in the passageway as it enters the passageway through the second opening. However, it is undesirable for feed to accumulate on a surface of the passageway during use, as this may lead to blockages of the passageway. In addition, the accumulation of feed on a horizontal (or at least non-vertical) surface of the passageway is undesirable as it means that the accumulated food may be deliberately or accidentally spilled and wasted. This is particularly the case if a horizontal (or non-vertical) surface is provided between the first opening and the bend, and particularly on the inside of the bend.

In a specific embodiment of the invention, precluding the accumulation of feed on an inner surface of the passageway may be achieved by forming the inner surface of the passageway with no surfaces on which feed may be retained. For instance, no substantially horizontal surfaces, such as lands, ledges, lips or the like, may be provided on the inner surface of the passageway.

It is envisaged that one of the most likely locations for feed to accumulate within the animal feeding device will be between the first opening and a bend in the body, particularly when the first opening is located in a substantially vertical orientation. Thus, in order to preclude the accumulation of feed in the passageway, the inner surface of the passageway (and specifically the surface extending inwardly from the lower end of the first opening) may be provided at an angle to the horizontal from adjacent the first opening to the bend. Specifically, the inner surface may slope downwardly from the first opening to the bend.

Any suitable angle may be used, provided that the angle is sufficient to ensure that any feed that comes to rest on the inner surface of the passageway slides off into the lower portion of the animal feeding device. Thus, it is envisaged that the inner surface of the passageway may slope downwardly from the first opening to the bend. For instance, the inner surface of the passageway between the first opening and the bend may be provided at an angle of between 20° and 80° to the horizontal. More preferably, the inner surface of the passageway between the first opening and the bend may be provided at an angle of between 30° and 70° to the horizontal. Still more preferably, the inner surface of the passageway between the first opening and the bend may be provided at an angle of between 40° and 60° to the horizontal. In this way, any animal feed that comes to rest on the inner surface of the passageway may slide down the surface to the bend and then return to the lower portion of the animal feeding device.

In an alternative embodiment of the invention, the animal feeding device may be formed such that the distance between the first opening and the bend is sufficiently short that no surfaces on which feed may accumulate are present. In this embodiment of the invention, it is envisaged that the first opening may be located adjacent the bend.

In use, it is envisaged that the second end of the body may be located spaced apart from the base or bottom wall of the receptacle in which the animal feeding device is located. In this way, feed in the receptacle may enter the passageway through the second opening by passing through a gap between the base of the receptacle and the second opening.

In other embodiments of the invention, the second end of the body may be located abutting or in close proximity to the base of the receptacle. In this embodiment, it may be more difficult for feed to enter the passageway due to the relatively small gap between the second opening and the base of the receptacle. In this situation, the second end of the body may be provided with one or more cut-out portions through which feed may pass into the passageway.

The cut-out portions may be of any suitable size and shape, and it will be understood that the size, shape and number of cut-out portions may be dependent on the type of feed being used and the size of the animal feeding device. Preferably, however, the cut-out portions extend from the second end of the body along a portion of the length of the lower portion. In this way, openings are created in the body through which animal feed may pass.

Alternatively, the lower portion may be provided with a plurality of perforations along at least a portion of its length through which feed may enter the passageway.

Any suitable animal feed may be used with the animal feed device of the present invention, and a skilled addressee will understand that the type of animal feed will depend on the type of animal with which the animal feed device is used. For instance, the feed may comprise pellets, fodder, grain, biscuits (for instance, dog biscuits), food scraps, legumes and the like, or any suitable combination thereof.

In another aspect, the invention resides broadly in an animal feeding apparatus comprising a receptacle adapted to house a quantity of animal feed and an animal feeding device located at least partially within the receptacle, the animal feeding device having a body in the form of a channel having a substantially C-, U- or V-shape in cross section, the body further including a first opening in a first end thereof, the first opening extending through an aperture in an external surface of the receptacle, and a second opening in a second end thereof through which animal feed enters the passageway, the body comprising a passageway extending between the first opening and the second opening, the body further comprising one or more bends therein such that the first opening and the second opening are provided in different orientations to one another, and wherein the body is adapted to substantially preclude the accumulation of the animal feed on an inner surface of the passageway during use, and wherein an open portion of the channel is located so as to abut an inner surface of the receptacle.

The receptacle may be of any suitable size, shape or configuration. Preferably, the receptacle comprises a base wall, one or more side walls and an upper wall. It is envisaged that the aperture in the external surface of the receptacle through which the first opening extends may be provided in the one or more side walls of the receptacle.

In some embodiments of the invention, the receptacle may comprise a drum, barrel, tank, box, bin, hopper or the like, or any suitable combination thereof.

In some embodiments of the invention, the animal feeding apparatus may comprise a plurality of animal feeding devices therein. The plurality of animal feeding devices may be located adjacent one another or may be spaced apart horizontally from one another around the one or more side walls. In this way, multiple animals may access the animal feed at the same time. Alternatively, the plurality of animal feeding devices may be spaced apart vertically from one another on the one or more side walls. In this way, animals of different sizes may access the animal feed at the same time. In some embodiments of the invention, the animal feeding devices may be spaced apart both vertically and horizontally from one another.

The receptacle may be formed as an integral unit, or may be fabricated in sections that are fixedly or temporarily attached to one another. Preferably, at least an upper portion of the receptacle (preferably comprising at least the upper wall of the receptacle) may be movable relative to the remainder of the receptacle. Thus, for instance, the upper portion of the receptacle may comprise a lid portion adapted to be placed on a lower portion of the receptacle. The lid portion may be retained on the lower portion using, for instance, a frictional engagement, a screw-threaded engagement or one or more latches or the like. Alternatively, the lid portion may be hingedly or slidably connected to the lower portion.

It is envisaged that the lid portion may be removed periodically so as to add more animal feed to the receptacle, or to clean the receptacle when required.

Alternatively, the receptacle may be provided with one or more access portions therein, such as one or more hatches, ports or the like. In this way, access may be gained to the interior of the receptacle through the one or more access portions, for instance for cleaning or for the addition of fresh animal feed to the receptacle. The one or more access portions may be provided in an upper wall and/or one or more side walls of the receptacle.

In a preferred embodiment of the invention, the upper wall (or lid portion if present) may be shaped so as to discourage animals from roosting or perching thereon. This is of particular importance when the animals comprise poultry. In this embodiment, the upper wall (or lid portion if present) may be at least partially rounded so that no surfaces are provided on which to perch or roost. Alternatively, the upper wall (or lid portion if present) may be provided with one or more projection (points, spikes, bumps etc.) adapted to discourage roosting or perching on the lid portion by making it uncomfortable. In this way, the receptacle may be kept relatively clean and free of feathers, dirt, animal manure and the like.

The base wall of the receptacle may be of any suitable configuration. For instance, the base wall may be substantially flat. Alternatively, the base wall may be provided with one or more sloping portions adapted to direct feed in the receptacle towards the second opening of the animal feed device. In this way, it may be ensured that feed is present in the animal feed device even when the amount of animal feed in the receptacle is relatively low.

Providing sloping portions in the receptacle may also assist in the preventing feed from clinging to internal surfaces of the receptacle, particularly if the feed is slightly wet.

The sloping portions may be provided at any suitable angle to the horizontal, provided that the angle is sufficient to ensure that feed is directed towards the second opening of the animal feeding device. For instance, the sloping portions may be provided at an angle of between 20° and 80° to the horizontal. More preferably, the sloping portions may be provided at an angle of between 30° and 70° to the horizontal. Still more preferably, the sloping portions may be provided at an angle of between 40° and 60° to the horizontal.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
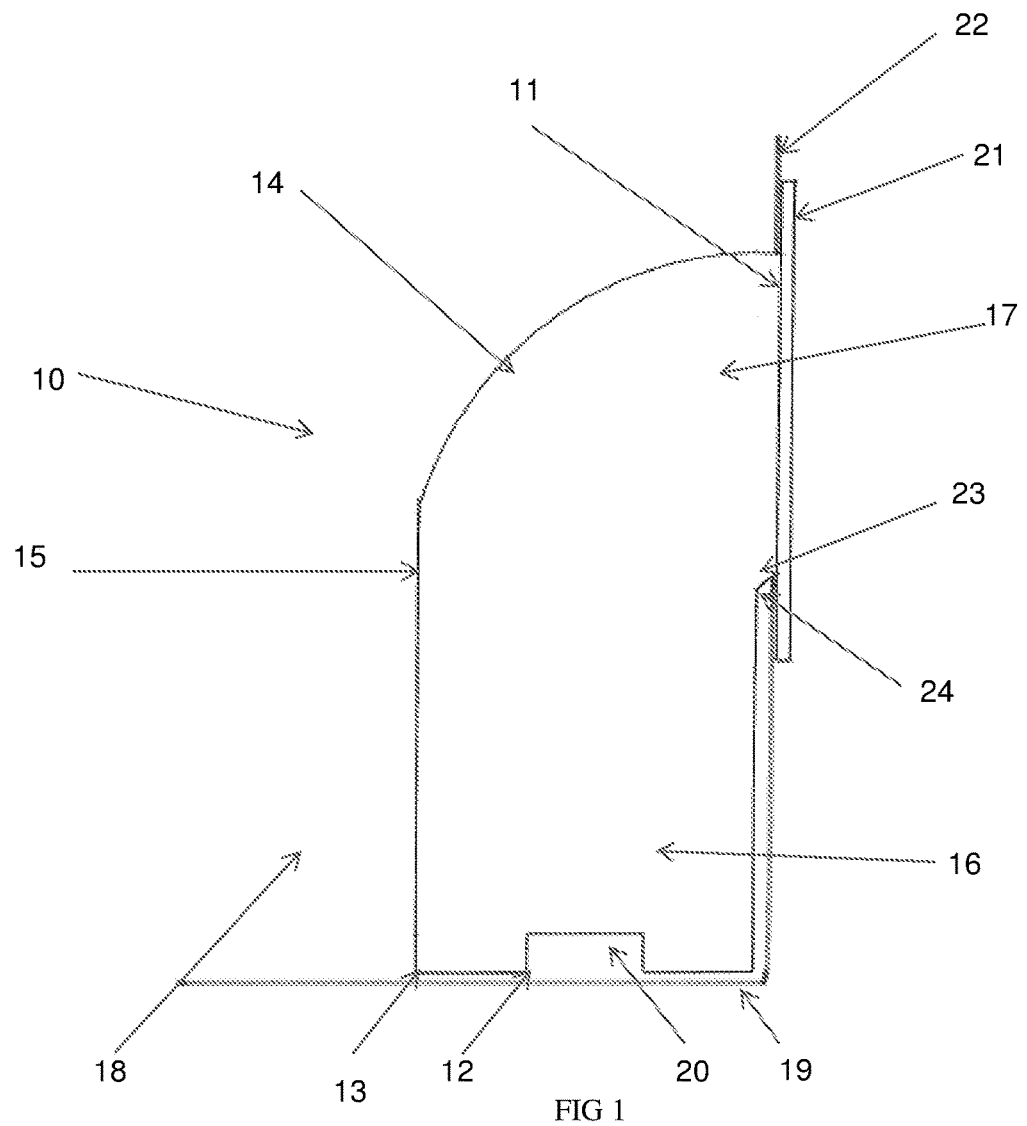
FIG. 1 illustrates a side view of an animal feeding device according to an embodiment of the present invention.

In FIG. 1 there is illustrated a side view of an animal feeding device 10 according to an embodiment of the present invention. The animal feeding device 10 comprises a body 15 having a first opening (obscured) in a first end 11 thereof and a second opening 12 at a second end 13 thereof. Between the first end 11 and the second end 13 is a bend 14 in the body 15. The bend 14 is located such that a lower portion 16 is located between the bend 14 and the second opening 12 and an upper portion 17 is located between the bend 14 and the first opening (obscured).

In use, as shown in FIG. 1, the second opening 12 is positioned substantially horizontally, while the first opening (obscured) is positioned substantially vertically, meaning that the first and second openings are provided at an angle of approximately 90° to one another.

The body 15 is tubular such that a passageway (obscured) is defined at the interior of the body 15 extending between the first opening (obscured) and the second opening 12.

In the embodiment of the invention shown in FIG. 1, the animal feeding device 10 is located within a receptacle 18 in which a quantity of animal feed (not shown) is housed. The second opening 12 is located spaced apart from the base 19 of the receptacle 18 so that feed may enter the body 15 through the second opening 12 and the cut-out portion 20 provided in the second end 13 of the body 15.

The first end 11 of the body 15 is provided with a flange 21 that extends through an aperture in the side wall 22 of the receptacle 18. The flange 21 abuts the outer surface of the side wall 22, thereby retaining the animal feeding device 10 in place within the receptacle 18.

In use, an animal (not shown) puts its head and neck through the first opening (obscured) and into the passageway (obscured) within the body 15. The animal then reaches down to the feed that is present in the lower portion 16 of the body 15. Once the animal has eaten sufficient feed, or has taken feed into its mouth, it can then withdraw its head through the first opening.

If the animal drops feed as it is withdrawing its head from the device 10, the lack of horizontal surfaces in the passageway on which the feed may alight means that another animal that subsequently uses the device 10 to obtain feed cannot remove feed from the passageway and discard it on the ground surrounding the receptacle 18. In this way, the wastage of animal feed may be reduced or eliminated.

The lack of horizontal surface on which feed may alight is achieved in two ways. Firstly the distance between the first opening (obscured) and the inner radius 23 of the bend 14 is relatively short, meaning that no lands or ledges that are large enough for feed to accumulate on are formed. Secondly, the surface 24 of the passageway (obscured) between the first opening (obscured) and the bend 14 is sloped (i.e. provided at an angle to the horizontal) at such an angle that feed that alights on the surface 24 slides off and returns to the lower portion 16 of the body 15.

Figure 2:
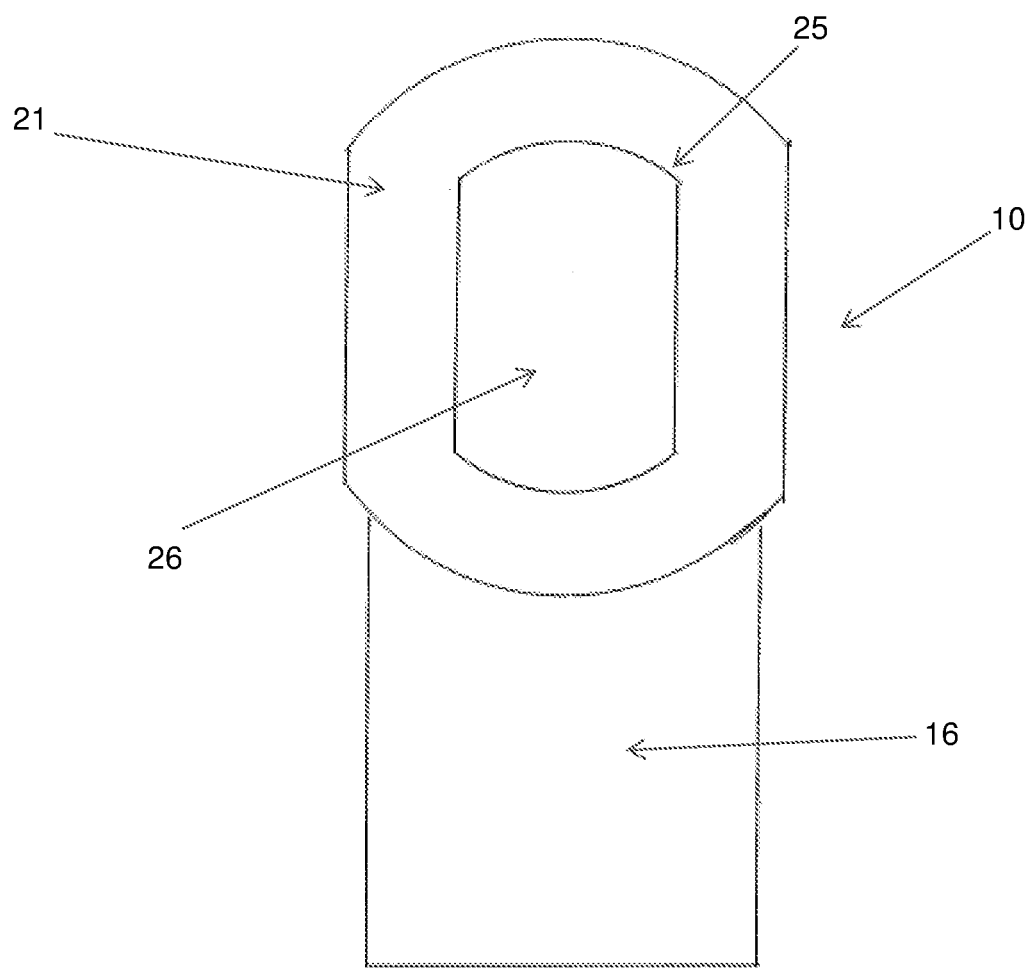
FIG. 2 illustrates a front view of an animal feeding device according to an embodiment of the present invention.

In FIG. 2 a front view of an animal feed device 10 according to an embodiment of the invention is shown. In this Figure, the first opening 25 of the animal feed device 10 may be seen. In use, an animal passes its head and neck into the first opening 25 to gain access to the passageway 26 and the animal feed stored therein.

The first opening 25 is provided in the flange 21. In this embodiment of the invention, the size of the first opening 25 is smaller than the diameter of the open first end of the body 15. Thus, in this embodiment of the invention, the animal feed device 10 is provided with a restricted first opening 25.

Providing a restricted first opening 25 ensures that only one animal at a time may access the passageway 26 and the feed contained therein. This eliminates competition between animals which can lead to spilling of feed. In addition, the first opening 25 is not large enough for an animal to withdraw its head while carrying large quantities of feed that will end up being wasted as spillage. In addition, the fact that an animal must extend its head down to the lower portion 16 of the animal feeding device 10 means that it may be uncomfortable or difficult for the animal to pick up large quantities of feed. This may be due, at least in part, to the substantially vertical orientation of the lower portion 16.

Figure 3:
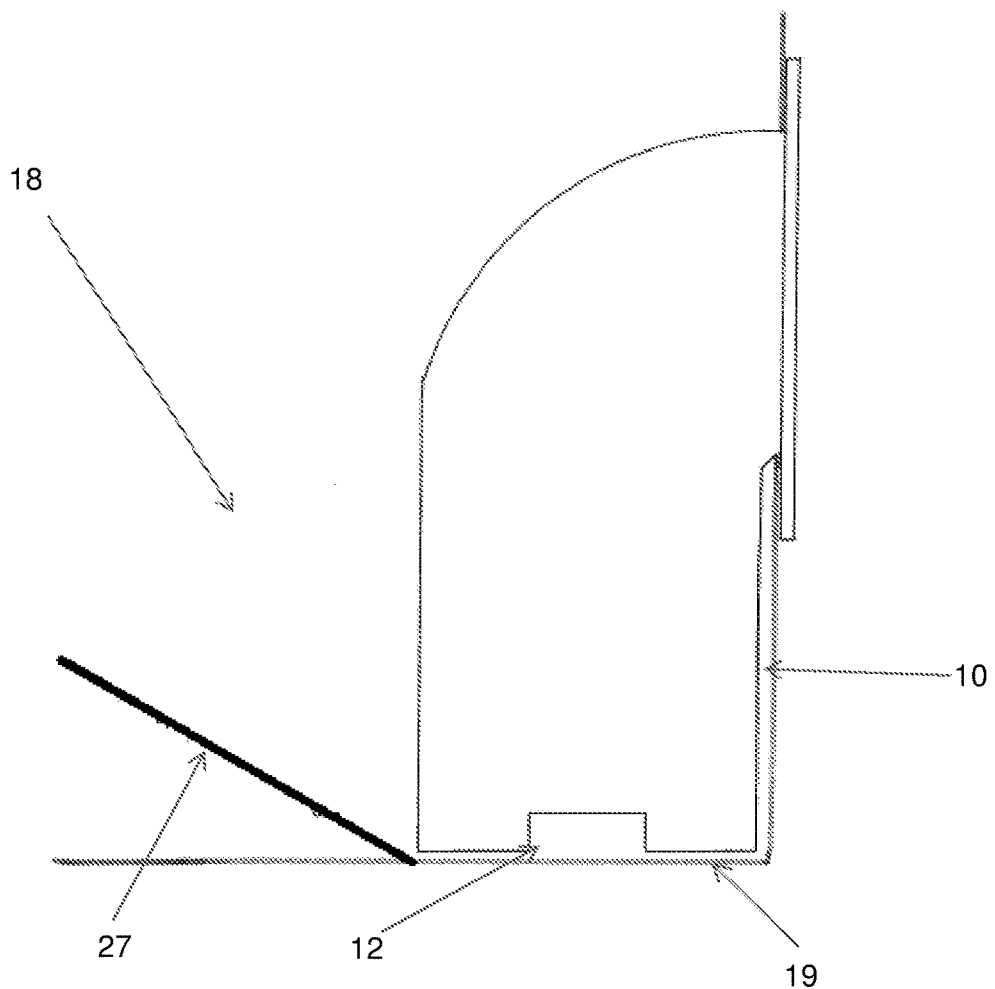
FIG. 3 illustrates a side view of an animal feeding device according to an embodiment of the present invention.

In FIG. 3 there is shown an animal feeding device 10 according to an embodiment of the invention. The animal feeding device 10 is identical to that illustrated in FIGS. 1 and 2. However, in FIG. 3 the base 19 of the receptacle 18 has been provided with a sloping portion 27. In use, feed in the receptacle 18 that alights on the sloping portion 27 is funneled downwards into the second opening 12 under the effect of gravity as feed is removed from the animal feeding device 10 by the animals. In this way, even when the quantity of feed in the receptacle 18 is running low, what feed remains is directed into the animal feeding device 10.

Figure 4A:
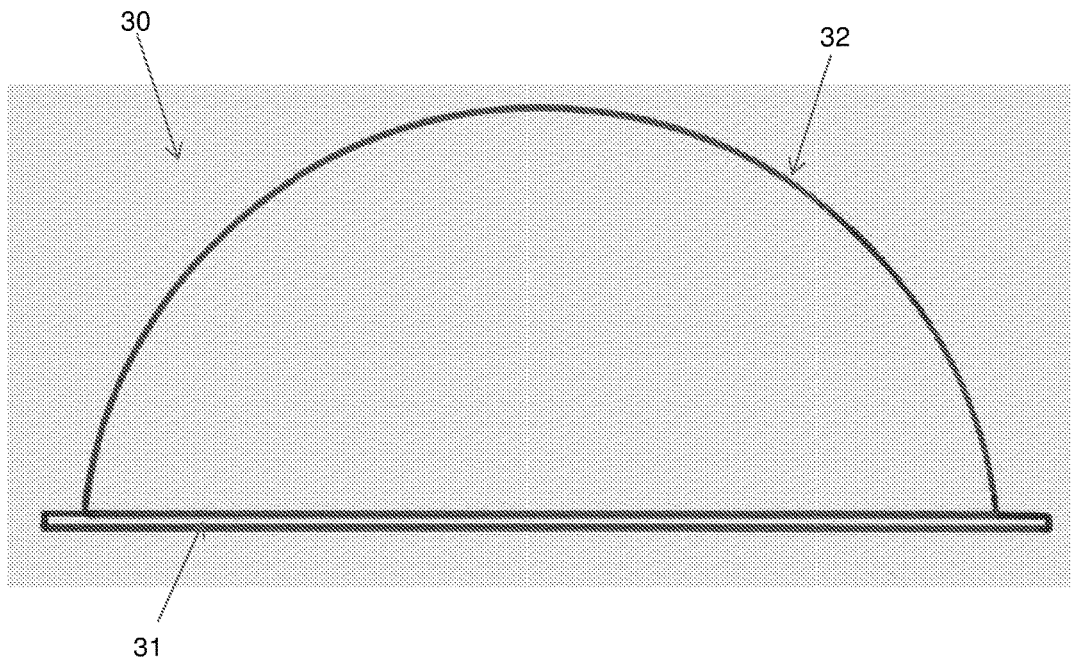
FIGS. 4A and 4B illustrate side views of an upper portion of a receptacle according to an embodiment of the present invention.
Figure 4B:
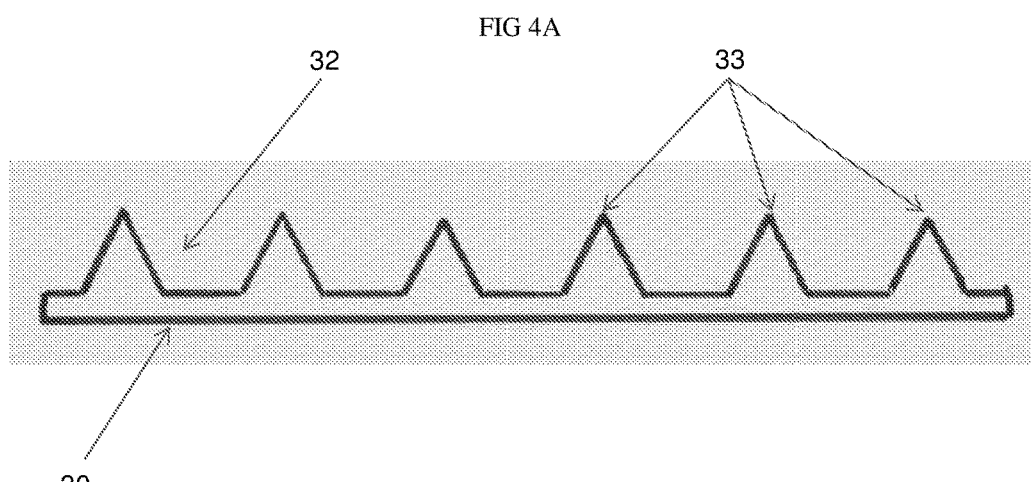

In FIGS. 4A and 4B there are illustrated side views of an upper portion 30 of a receptacle according to an embodiment of the present invention. In FIG. 4A the upper portion 30 of the receptacle comprises a lid that is located on top of the receptacle to prevent animals from gaining access to the interior of the receptacle. The upper portion 30 may be removed as required so as to add animal feed to the receptacle or to clean the interior of the receptacle.

The upper portion 30 comprises a base portion 31 adapted to form an upper wall of the receptacle and an upper surface 32 in the form of a dome. By providing the upper surface 32 in the form of a dome, animals are prevented from roosting or perching thereon, as the domed shape of the upper surface 32 does not provide a surface on which the animal may balance comfortably. In this way, the accumulation of dirt, faeces, feather/fur or the like on the upper portion 30 of the receptacle may be substantially precluded.

In FIG. 4B an upper portion 30 of a receptacle according to an alternative embodiment of the invention is illustrated. In this embodiment, the upper surface 32 comprises a plurality of spikes 33 adapted to make roosting or perching on the upper portion 30 uncomfortable for an animal. It is worth noting that the spikes 33 are not intended to injure an animal in any way. Instead, they are simply provided to discourage perching on the upper portion 32 by making the upper portion 32 uncomfortable to an animal. As with the upper portion illustrated in FIG. 4A, the upper portion of 4B substantially precludes the accumulation of dirt, faeces, feather/fur or the like thereon.

Figure 5:
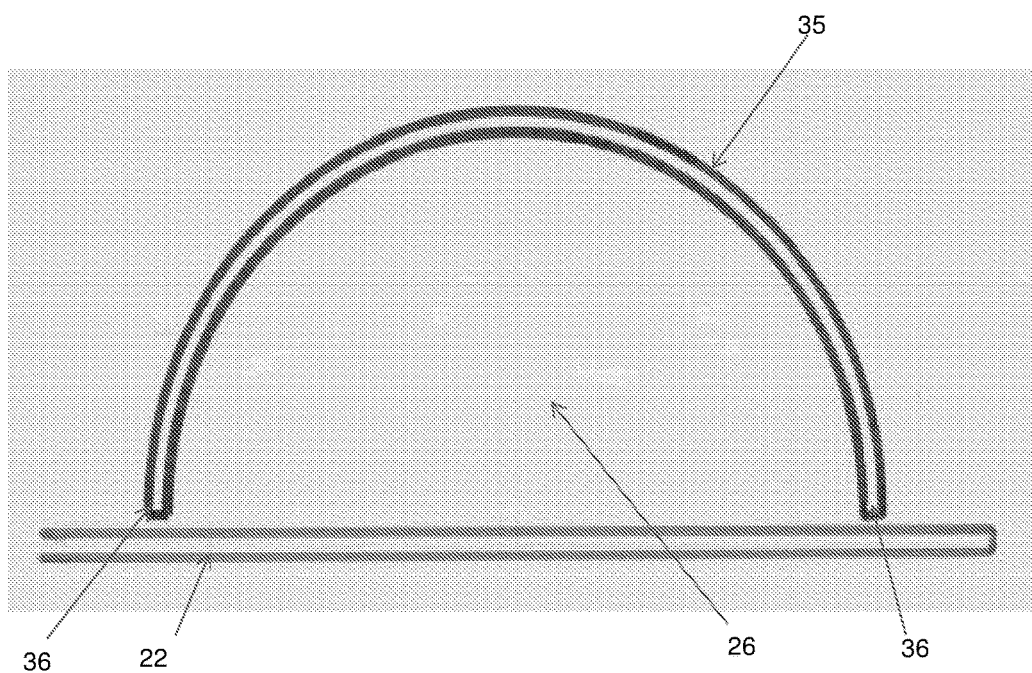
FIG. 5 illustrates a plan view of an animal feeding device according to an embodiment of the present invention.

In FIG. 5 there is illustrated a plan view of an animal feeding device 10 according to an alternative embodiment of the invention. In this embodiment of the invention, the animal feeding device 10 comprises a substantially C- U- or V-shaped channel 35. The open portion of the channel 35 is placed in abutment with, or close proximity to, an inner surface of a side wall 22 of a receptacle such that the passageway 26 is defined by the inner surface of the channel 35 and the inner surface of the side wall 22.

In a preferred embodiment of the invention, the portion of the side wall 22 located between the ends 36 of the channel 35 may be transparent so that a user can view the level (quantity) of animal feed in the passageway, as well as the feeding activity of the animals.

Figure 6:
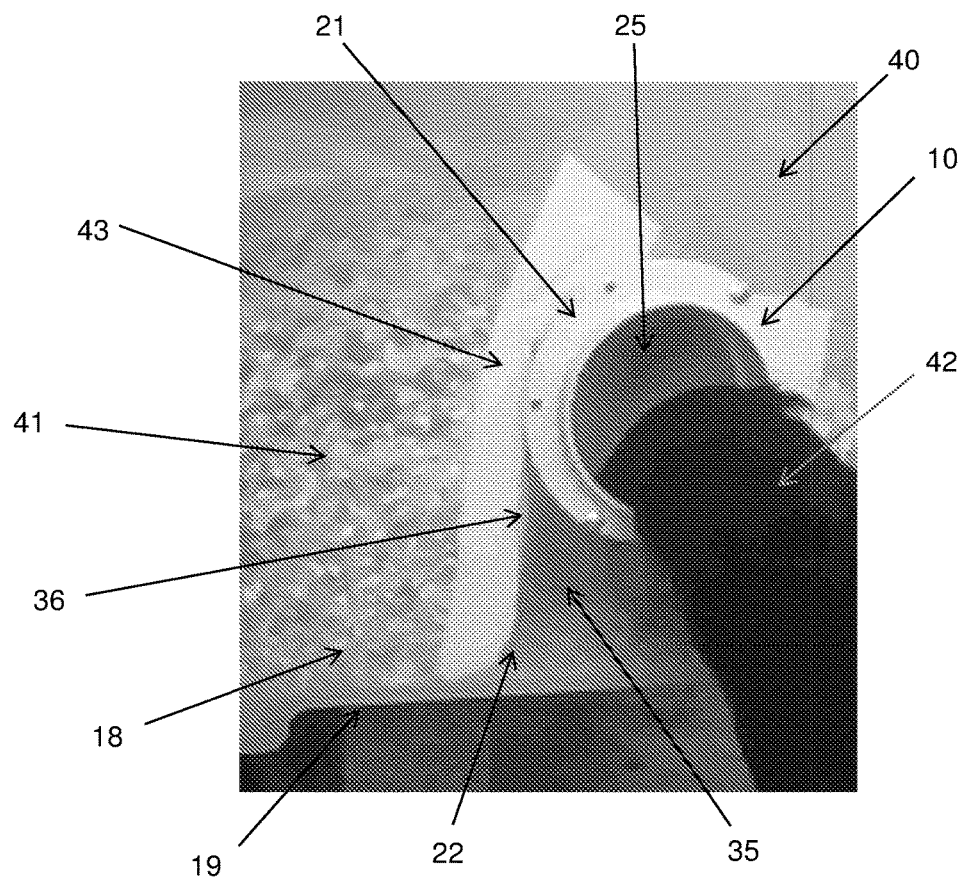
FIG. 6 illustrates a front view of an animal feeding assembly according to an embodiment of the invention.

In FIG. 6 there is shown a front view of an animal feeding assembly 40 according to an embodiment of the present invention. In this Figure, an animal feeding device 10 similar to that illustrated in FIG. 5 is located within a receptacle 18 in which a quantity of animal feed 41 (in this instance, grain) is located.

The animal feeding device 10 is located such that the C-, U- or V-shaped channel 35 is placed in abutment with an inner surface of a side wall 22 of the receptacle 18. The side wall 22 of the receptacle is fabricated from a substantially transparent material (in the form of a plastic) meaning that a user can view the interior of the channel 35 from outside the receptacle 18 so that the level of animal feed 41 in the channel can be observed, and more grain added to the receptacle 18 if the level is too low.

The animal feeding device 10 includes a flange 21 that is located in abutment with an outer surface of the side wall 22 of the receptacle 18. In the embodiment of the invention shown in FIG. 6, the flange is retained in abutment with the outer surface of the side wall 22 by adhesives.

The flange includes an opening 25 therein through which an animal (in this case a chicken 42) can place its head so as to access the animal feed 41 within the channel 35. Grain 41 enters the channel through one of more openings or cut-out portion (obscured) located at the end of the animal feeding device located adjacent the base 19 of the receptacle 18. In addition, the ends 36 of the channel 35 are placed in abutment with the side wall 22 and sealant 43 is applied so as to create a seal between the ends 36 of the channel 35 and the side wall 22. In this way, animal feed 41 is precluded from entering the channel 35 other than through the one or more openings or cut-out portions (obscured) located adjacent the base 19 of the receptacle 18.

By restricting the ways in which animal feed 41 may enter the channel 35, the level of animal feed 41 within the channel 35 remains relatively low. Thus, the wastage of animal feed is minimised, as the chicken 43 must stretch its head down towards the base 19 of the receptacle 18 in order to reach the animal feed 41. Thus, the chicken 43 is unable to scatter grain, as would occur if the level of grain in the channel 35 were higher and therefore closer to the opening 25.

In addition, the size of the opening 25 is restricted such that only one chicken 43 can placed its head into the channel 35 at a time. Again, this assists in reducing the wastage of grain as chickens are prevented from fighting over the grain which occurs in conventional feeding devices if multiple chickens are able to access the grain at the same time.

Further, the lack of grain spilled on the ground, and the relative inaccessibility of the grain in comparison to conventional animal feeding devices, means that the animal feeding assembly 40 will attract fewer pests and vermin.

Figure 7:
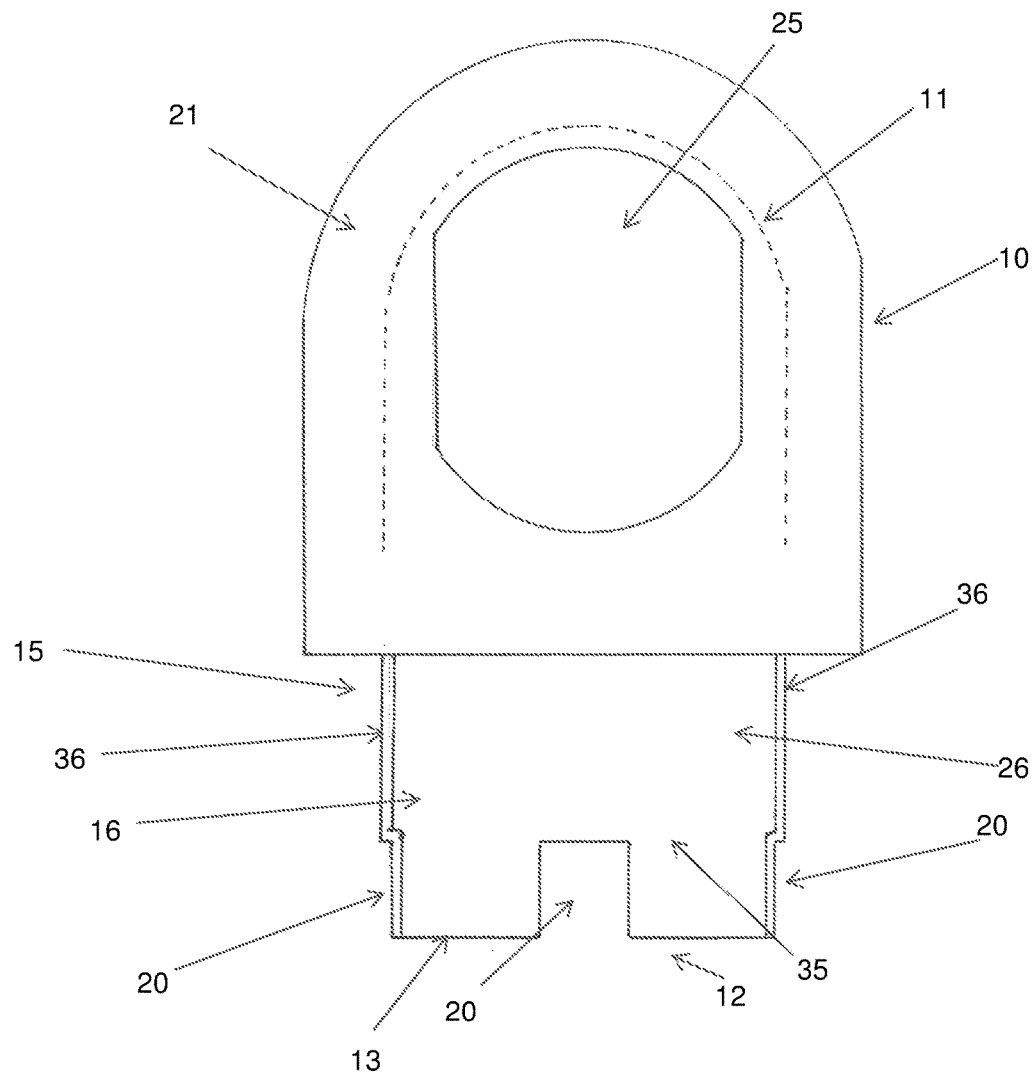
FIG. 7 illustrates a front view of an animal feeding device according to an embodiment of the present invention.

In FIG. 7, a front view of an animal feeding device 10 similar to that used in the animal feeding assembly illustrated in FIG. 6 is shown. The animal feeding device 10 comprises a body 15 having a first opening 25 in a first end 11 thereof and a second opening 12 at a second end 13 thereof.

In use, the flange 21 protrudes through a wall (not shown) of a receptacle (not shown), such that a rear surface of the flange 21 is retained in abutment with an outer surface of the wall. Preferably, the rear surface of the flange 21 is retained in abutment with the outer surface of the wall using a sealant, adhesives or the like.

The animal feeding device 10 comprises a flange 21 at the first end 11 of the body 15. In use, an animal passes its head and neck into the first opening 25 to gain access to the passageway 26 extending between the first end 11 and the second end 13 of the body 15 and the animal feed stored therein.

The first opening 25 is provided in the flange 21. In this embodiment of the invention, the size of the first opening 25 is smaller than the diameter of the open first end 11 of the body 15. Thus, in this embodiment of the invention, the animal feed device 10 is provided with a restricted first opening 25.

Providing a restricted first opening 25 ensures that only one animal at a time may access the passageway 26 and the feed contained therein. This eliminates competition between animals which can lead to spilling of feed. In addition, the first opening 25 is not large enough for an animal to withdraw its head while carrying large quantities of feed that will end up being wasted as spillage. In addition, the fact that an animal must extend its head down to the lower portion 16 of the animal feeding device 10 means that it may be uncomfortable or difficult for the animal to pick up large quantities of feed.

The body 15 of the animal feeding device 10 is in the form of a C-, U- or V-shaped channel 35. The open portion of the channel 35 is placed in abutment with, or close proximity to, an inner surface of a wall (not shown) of a receptacle (not shown) such that the passageway 26 is defined by the inner surface of the channel 35 and the inner surface of the wall (not shown).

The ends 36 of the channel 35 are, in use, located in abutment with an inner surface of a wall (not shown) of a receptacle (not shown). Preferably, the ends 36 of the channel 35 are retained in abutment with the wall (not shown) using a sealant, adhesive or the like so as to create a seal between the ends 36 and the wall (not shown). In this way, animal feed is precluded from entering the channel 35 other than through the cut-out portions 20 located at or adjacent the second end 13 of the body 15.

Figure 8:
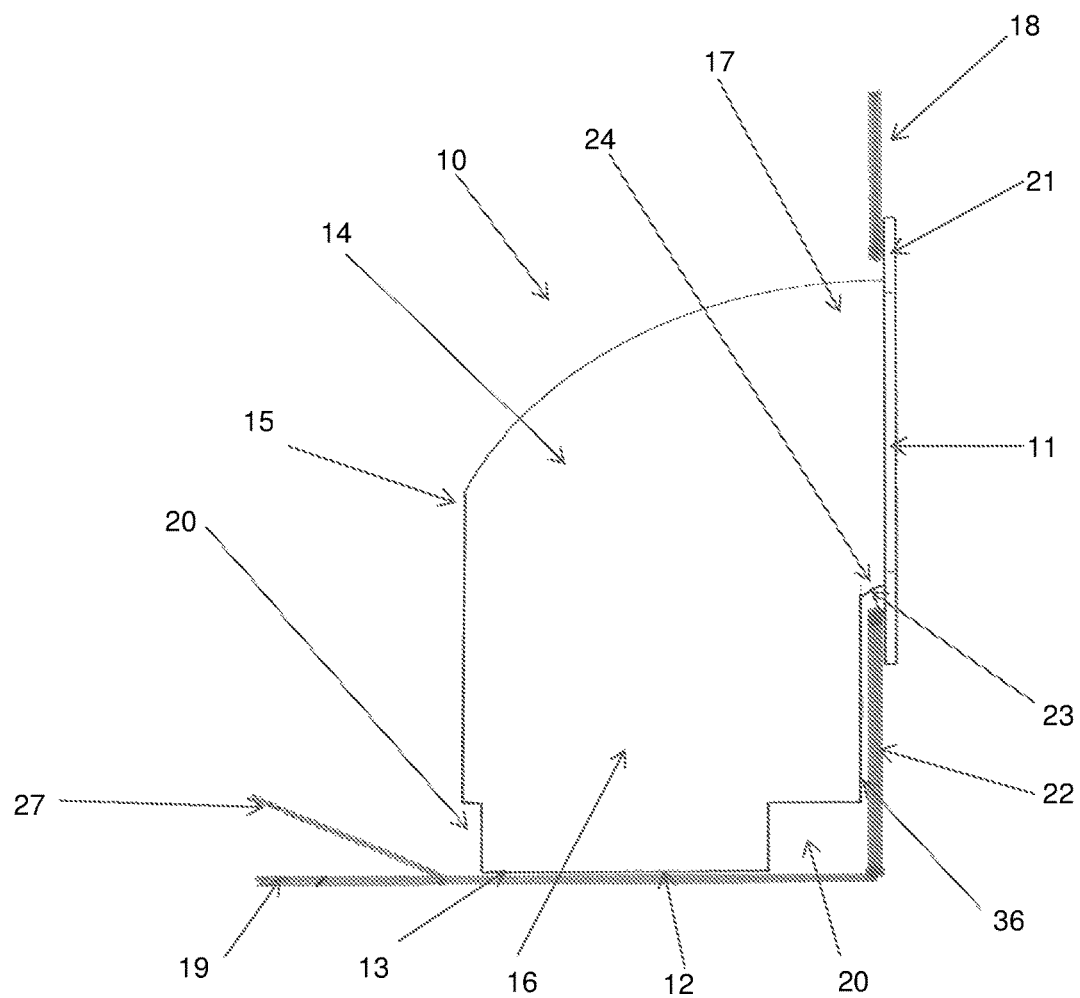
FIG. 8 illustrates a side view of an animal feeding device according to an embodiment of the present invention.

In FIG. 8, a side view of the animal feeding device 10 of FIG. 7 is illustrated. The animal feeding device 10 comprises a body 15 having a first opening (obscured) in a first end 11 thereof and a second opening 12 at a second end 13 thereof. Between the first end 11 and the second end 13 is a bend 14 in the body 15. The bend 14 is located such that a lower portion 16 is located between the bend 14 and the second opening 12 and an upper portion 17 is located between the bend 14 and the first opening (obscured).

In use, as shown in FIG. 8, the second opening 12 is positioned substantially horizontally, while the first opening (obscured) is positioned substantially vertically, meaning that the first and second openings are provided at an angle of approximately 90° to one another.

The body 15 is C-, U- or V-shaped such that a channel (obscured) is defined at the interior of the body 15 extending between the first opening (obscured) and the second opening 12. The ends 36 of the channel (obscured) are retained in abutment with an inner surface of a side wall 22 of a receptacle 18 such that a passageway (obscured) defined by the channel (obscured) and the side wall 22 is formed between the first opening (obscured) and the second opening 12.

In the embodiment of the invention shown in FIG. 7, the animal feeding device 10 is located within a receptacle 18 in which a quantity of animal feed (not shown) is housed. The second opening 12 is located spaced apart from the base 19 of the receptacle 18 so that feed may enter the body 15 through the second opening 12 and the cut-out portions 20 provided in the second end 13 of the body 15.

The first end 11 of the body 15 is provided with a flange 21 that extends through an aperture in the side wall 22 of the receptacle 18. The flange 21 abuts the outer surface of the side wall 22, thereby retaining the animal feeding device 10 in place within the receptacle 18. Preferably, the surface of the flange 21 in abutment with the outer surface of the side wall 22 is retained in place by adhesives, sealant or the like.

In use, an animal (not shown) puts its head and neck through the first opening (obscured) and into the passageway (obscured) within the body 15. The animal then reaches down to the feed that is present in the lower portion 16 of the body 15. Once the animal has eaten sufficient feed, or has taken feed into its mouth, it can then withdraw its head through the first opening.

If the animal drops feed as it is withdrawing its head from the device 10, the lack of horizontal surfaces in the passageway on which the feed may alight means that another animal that subsequently uses the device 10 to obtain feed cannot remove feed from the passageway and discard it on the ground surrounding the receptacle 18. In this way, the wastage of animal feed may be reduced or eliminated.

The lack of horizontal surface on which feed may alight is achieved in two ways. Firstly the distance between the first opening (obscured) and the inner radius 23 of the bend 14 is relatively short, meaning that no lands or ledges that are large enough for feed to accumulate on are formed. Secondly, the surface 24 of the passageway (obscured) between the first opening (obscured) and the bend 14 is sloped (i.e. provided at an angle to the horizontal) at such an angle that feed that alights on the surface 24 slides off and returns to the lower portion 16 of the body 15.

In FIG. 8 the base 19 of the receptacle 18 has been provided with a sloping portion 27. In use, feed in the receptacle 18 that alights on the sloping portion 27 is funneled downwards into the second opening 12 and cut-out portions 20 under the effect of gravity as feed is removed from the animal feeding device 10 by the animals. In this way, even when the quantity of feed in the receptacle 18 is running low, what feed remains is directed into the animal feeding device 10.

It will be noted on this Figure that the second opening 12 is spaced a distance apart from the base 19 of the receptacle 18, so that feed may enter the animal feeding device 10 through both the second opening 12 and the cut-out portions 20.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An animal feeding apparatus comprising:
   a receptacle comprising a base wall, one or more side walls, and an upper wall, wherein the receptacle is adapted to house a quantity of animal feed on the base wall thereof; and
   an animal feeding device located at least partially within the receptacle, the animal feeding device having a body defining a channel having a substantially C-, U- or V-shape cross section, wherein:
      the body comprises:
         a first opening in a first end thereof, wherein the first opening extends through an aperture in an external surface of at least one of the one or more side walls of the receptacle; and
         a second opening in a second end thereof through which the animal feed enters a passageway extending between the first opening and the second opening, wherein:
            the second end of the body abuts or is in close proximity to the base wall of the receptacle such that the animal feed remains on the base wall within the passageway,
            the body further comprises one or more bends therein such that the first opening and the second opening are provided in different orientations to one another,
            the body is adapted to substantially preclude an accumulation of the animal feed on an inner surface of the passageway during use,
            an open portion of the channel is located so as to abut an inner surface of at least one of the one or more side walls of the receptacle, and
            the base wall is provided with one or more sloping portions adapted to direct the animal feed in the receptacle through the second opening and into the passageway.

2. An animal feeding apparatus according to claim 1, wherein the upper wall is shaped so as to discourage animals from roosting or perching thereon.

3. An animal feeding apparatus according to claim 1, wherein the second opening is spaced apart from the base wall such that the animal feed may enter the passageway through a gap between the second opening and the base wall.

4. An animal feeding apparatus according to claim 1, wherein the animal feeding apparatus is provided with a plurality of animal feeding devices.

5. An animal feeding apparatus according to claim 1, wherein:
   the channel abuts a first side wall of the one or more side walls of the receptacle, and
   at least a portion of the first side wall is fabricated from a substantially transparent material.

6. An animal feeding apparatus according to claim 1, wherein the passageway extends in a substantially vertical orientation between the first opening and the second opening.

7. An animal feeding apparatus according to claim 1, wherein an entirety of the first opening is spaced apart vertically from an entirety of the second opening.

8. An animal feeding apparatus according to claim 1, wherein a size of the first opening is restricted, such that the first opening is smaller than a width of a respective open end of the body.

9. An animal feeding apparatus according to claim 1, wherein a size of the first opening is restricted such that only a head, and optionally at least a portion of a neck, of one animal is capable of entering the passageway at any time.

10. The animal feeding apparatus according to claim 1, the body comprising a flange portion configured to abut the external surface of the at least one of the one or more side walls of the receptacle.

11. The animal feeding apparatus according to claim 10, wherein the flange portion is secured to the external surface of the at least one of the one or more side walls of the receptacle through at least one of an adhesive or a fastener.

12. The animal feeding apparatus according to claim 10, wherein the flange portion defines the first opening.

13. The animal feeding apparatus of claim 1, comprising a cut-out portion defining a substantially u-shaped notch adjacent the second end of the body.

14. The animal feeding apparatus of claim 1, wherein the animal feeding device is located entirely within the receptacle.

15. The animal feeding apparatus of claim 1, wherein the second end of the body faces the base wall.

* * * * *